May 16, 1933.  W. L. ROSS  1,909,551
CURBING
Filed March 3, 1931
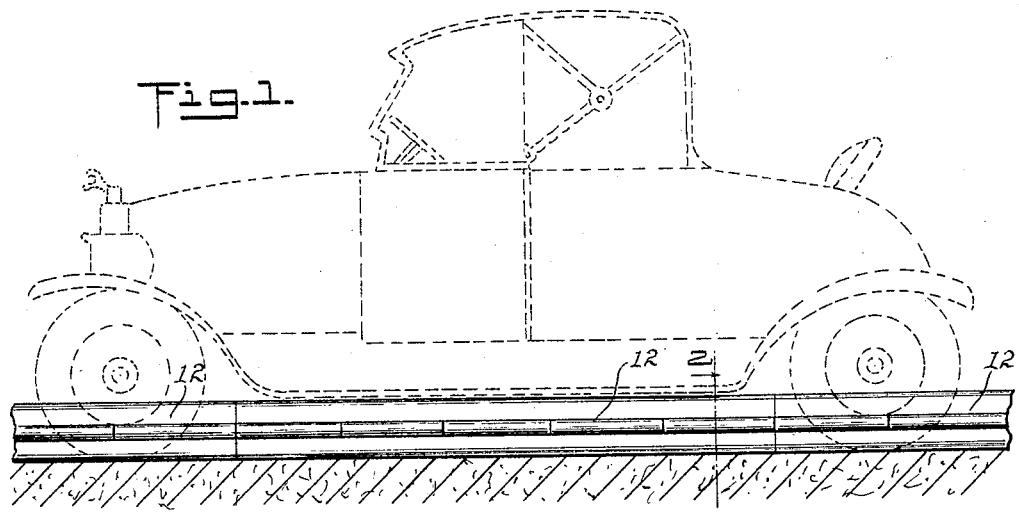
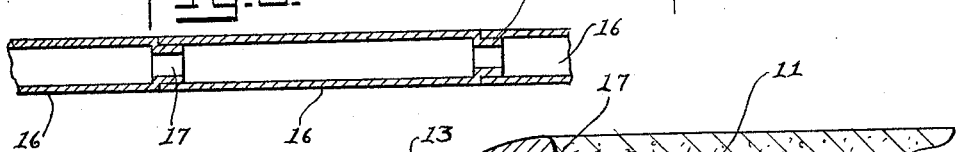
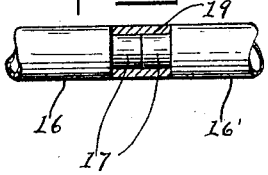
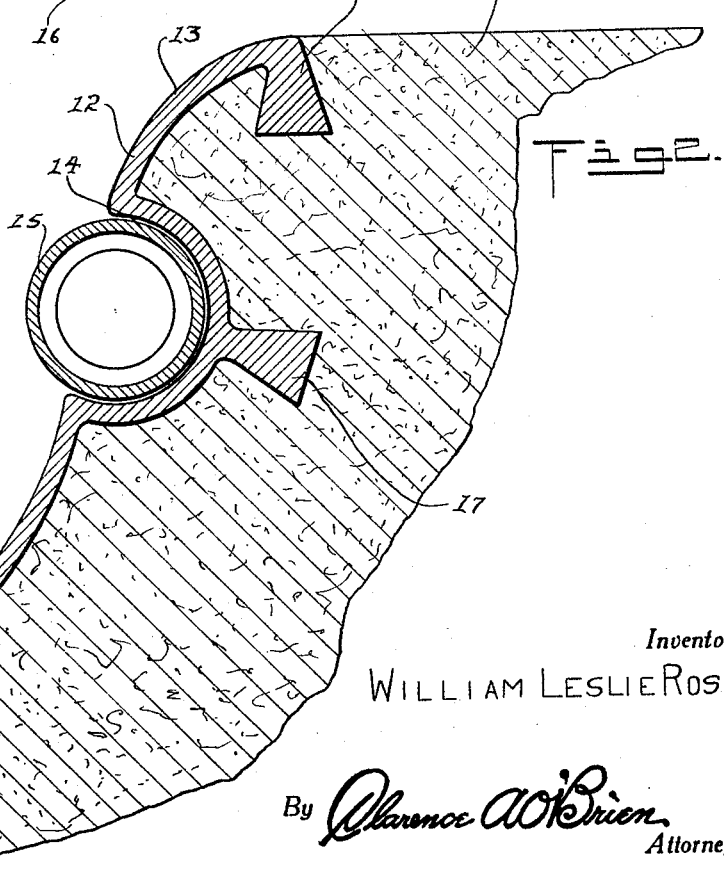
Inventor
WILLIAM LESLIE ROSS
By *Clarence A. O'Brien*
Attorney Patented May 16, 1933

1,909,551

UNITED STATES PATENT OFFICE

WILLIAM LESLIE ROSS, OF WAREHAM, MASSACHUSETTS

CURBING

Application filed March 3, 1931. Serial No. 519,831.

This invention relates to improvements in curbing.

The primary object of the invention resides in a street or road curbing which will facilitate the ease in parking an automobile in a restricted space against the curb and which reduces the friction and shock to which automobile tires are subjected when coming in contact therewith.

Another object is to provide a curbing including a rotatable roller which has its peripheral edge projecting beyond the edge of its support, and against which the tires of an automobile will abut during the parking of a car against the curb and which serves to prevent the wheels of an automobile from accidentally riding up over the curbing when an automobile is driven front end or rear end into parking position thereagainst.

A further object is the provision of a metal curbing which prevents the wearing away of a concrete side walk usually provided along a street or vehicle thoroughfare.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a fragmentary vertical sectional view through a street or roadway looking at my improved curbing in front elevation.

Figure 2 is an enlarged vertical transverse sectional view on the line 2—2 of Figure 1.

Figure 3 is an enlarged detail longitudinal sectional view showing the manner in which the roller elements are connected together.

Figure 4 is a sectional elevational view illustrating a slight modification.

Referring to the drawing by reference characters, the numeral 10 designates the surface of a street, roadway or other thoroughfare which is provided with an elevated side walk 11 which may be constructed of concrete or the like. My improved curbing is adapted to protect the shoulder formed between the elevated side walk 11 and the street level 10 and which curbing is constructed in a manner now to be explained.

My improved curbing is constructed of an elongated metal body or guard plate 12 which may be formed in various predetermined lengths, and which is curved transversely in opposite directions as at 13 and 14. The curved portion 13 is adapted to provide a rounded edge which in practice merges with the top of the side walk 11, while the curved portion 14 has its concaved side merging into the level of the street 10. The body or guard plate 12 may be formed either from a casting or from a stamped and bent material such as steel, but regardless of the manner in which the said body is formed, the same is provided in which the said body is formed, the same is provided with a substantially semi-circular shaped recess 14 which extends the length of the body and is disposed approximately centrally of the width thereof. This longitudinal recess is slightly more than a semi-circle to act as a bearing for receiving and supporting a rotatable roller 15, the periphery of which extends beyond the open side of the recess 14 and consequently beyond the outer side of the body 12. This roller 15 may be of a solid construction, or tubular as shown in the drawing, and as shown in Figure 3, each roller 15 may be constructed of a plurality of cylindrical members 16. One of the ends of each member 16 is provided with a reduced collar or nipple 17 to enable the other end of an adjacent member to fit thereon as best seen in Figure 3 of the drawing. By connecting the cylindrical members 16 in this manner, the nipple 17 of one member constitutes a bearing for one end of the next adjacent member. The roller 15 is of course inserted into the recess through either end thereof and the said roller may be constructed of any number of sections 16 depending of course upon the particular length of the guard plate or body 12. The body or guard plate 12 may be of a standard length so as to accommodate a predetermined number of the roller sections 16 in order that the roller will extend the full length of the body.

Extending inwardly from the top and bottom edges of the body 12 and from the curved wall of the recess 14 are anchor members or ribs 17 which are adapted to be embedded in the concrete or other material from which the side walk 11 and street 10 are constructed. These anchor members serve to securely hold the curbing sections in position as will be seen by reference to Figure 2 of the drawing.

In practice, as shown in Figure 1 of the drawing, curbing sections are placed end to end, and produce an uninterrupted curb with the roller 15 projecting beyond the body of the curbing to be engaged by the tires of an automobile when such a vehicle is driven alongside of the curb for parking, or when the automobile is backed or driven front end first into a parking space alongside of a sidewalk. These rollers serve to reduce friction between the curbing and the tire, and thus act to prolong the life of the tire or tires of an automobile. Furthermore the rollers prevent the wheels of a vehicle from accidentally mounting the curb and riding onto the sidewalk during parking of a vehicle as the said rollers will merely rotate or spin when the tires of the wheels contact therewith.

In Figure 4 of the drawing I have illustrated a slightly modified form in which the cylindrical roller members 16' are provided with reduced collars or nipples 17' at opposite ends, and said collars of the adjacent roller members being brought end to end and connects by a sleeve 19 of an external diameter equal to the exterior diameter of the roller members 16. These sleeves 19 act as a bearing for the ends of the roller members and produce an uninterrupted roller surface along the curbing.

While I have shown and described what I deem to be the most desirable embodiment of my invention, I wish it to be understood that various changes in construction may be resorted to if desired, and I do not wish to limit myself to the exact structural details herein set forth nor to anything less than the whole of my invention, limited only by the appended claims.

Having thus described the invention, what I claim as new and desire to secure by Letters Patent is:

1. In a curbing, an elongated body having a substantially semi-circular shaped recess extending the length thereof, and a roller seated in said recess and rotatably held therein by the walls thereof, the peripheral wall of said roller extending beyond one side of said body.

2. In a curbing, an elongated body having a substantially semi-circular shaped recess extending the length thereof, and a roller seated in said recess and rotatably held therein by the walls thereof, the peripheral wall of said roller extending beyond one side of said body, and wedge-shaped anchor members formed on and extending from said body.

3. In a curbing, an elongated guard plate having a semi-circular shaped recess extending longitudinally thereof, and extending laterally thereof above said recess a convex face, and a concave face at the bottom, and a roller rotatably mounted in said recess.

4. In a curbing, an elongated guard plate having a semi-circular shaped recess extending longitudinally thereof, and extending laterally thereof and above said recess a convex face, and a concave face at the bottom, and wedge-shaped anchor means on the back of said plate adjacent said recess, and a roller rotatably mounted in said recess.

In testimony whereof I affix my signature.

WILLIAM LESLIE ROSS.